(12) United States Patent
Dutrisac et al.

(10) Patent No.: US 6,222,668 B1
(45) Date of Patent: Apr. 24, 2001

(54) FAST LOSS OF SIGNAL (LOS) DETECTION FOR BIDIRECTIONAL OPTICAL AMPLIFIERS

(75) Inventors: Mathieu Dutrisac, Ste-Foy; Richard Achile Habel, Ottawa; Robert Keys; Franz Li Hsien Mok, both of Kanata; Jeffrey Alan Weslowski, Nepean, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/074,661

(22) Filed: May 8, 1998

(51) Int. Cl.[7] ................................................. H04B 10/08
(52) U.S. Cl. ......................... 359/337; 359/110; 359/117
(58) Field of Search ................................. 359/110, 143, 359/177, 337, 341

(56) References Cited

U.S. PATENT DOCUMENTS

| | | | | |
|---|---|---|---|---|
| 4,393,493 | * | 7/1983 | Edwards | 370/16 |
| 5,442,472 | * | 8/1995 | Skrobko | 359/110 |
| 5,701,195 | * | 12/1997 | Akikama | 359/341 |
| 5,812,289 | * | 9/1998 | Tomooka et al. | 359/115 |
| 5,838,476 | * | 11/1998 | Haresawa et al. | 359/177 |
| 6,064,501 | * | 5/2000 | Roberts et al. | 359/110 |
| 6,075,629 | * | 6/2000 | Al-Salameh et al. | 359/110 |
| 6,115,157 | * | 9/2000 | Barnard et al. | 359/124 |

* cited by examiner

Primary Examiner—Nelson Moskowitz
(74) Attorney, Agent, or Firm—Aprilia U. Diaconescu

(57) ABSTRACT

A fast means of detecting that a fiber has been disconnected at one end of a bidirectional optical amplifier by monitoring for several signature effects simultaneously. Upon detection of a loss of signal, the pump laser in the corresponding direction is shut off quickly to prevent oscillation from occurring should the other end of the amplifier be subsequently disconnected.

20 Claims, 7 Drawing Sheets

FAST LOSS OF SIGNAL (LOS) DETECTION FOR BIDIRECTIONAL OPTICAL AMPLIFIERS

BACKGROUND OF THE INVENTION

1. Field of the Invention

This invention is directed to methods and devices for detecting a loss of signal in an optical transmission system, and more particularly, to detection of a loss of signal and the inputs of bidirectional optical amplifiers.

2. Background Art

In an optical transmission system, a loss of input signal alarm is an important tool for determining that an optical connector has been disconnected, a cable has been broken, removed, or introduces a high loss.

Moreover, in optical amplified systems, the reflection of a significant portion of the light leaving via a given fiber may cause problems with detection of the loss of the input signal on that fiber. The outgoing light, that is then reflected, could be amplified signal and amplified spontaneous emission (ASE), in the case of a bidirectional system, or could be just ASE, in the case of a unidirectional system. Or, the outgoing light could be a combination of signals and ASE from both directions in the case where there are more complex optical path reflections. If the reflected outgoing light could be distinguished from the desired input signal, then appropriate alarms or control actions could be initiated.

In bidirectional optical amplifier applications, whenever both connectors are open with the pump laser in both directions being "on", reflections can cause Q-switching and oscillations, despite the optical isolators that may be present. The oscillation path can involve more than one optical amplifier in the system and be quite complex. Prevention of this condition is desirable, as this phenomena can cause damage to the amplifier.

If a fiber is accidentally disconnected from one particular input of the amplifier, the amplifier should be shut off in that direction to minimize the risk of self-oscillation and Q-switching. In addition, shutting off the laser pump must occur very fast, before the other fiber can be disconnected.

For this reason, it is advantageous for a bidirectional amplifier to have a fast method of detecting a loss of signal (LOS) due to a disconnected fiber, in order that the amplifier can be shut off quickly in the corresponding direction.

Measurement of the strength of reflections is presently done with an optical time domain reflectometer (OTDR) that sends strong short pluses of light down a fiber and measures the signal returned to determined LOS conditions from sudden increases in reflected power levels. This is an accurate method, but the OTDR is a relatively large and expensive piece of test equipment that can not be easily used while there is traffic on the fiber. Also, as an OTDR is a separate device from the amplifier, there is no direct means of shutting off the amplifier in a particular direction when the reflection condition is detected.

Another prior art method for detecting reflections is to measure the amount of DC light reflected back via a four port coupler. However, this method cannot be used in bidirectional systems.

Techniques such as disclosed in U.S. patent application Ser. No. 08/588,776 (O'Sullivan et al.) filed Jan. 18, 1996 and assigned to Northern Telecom Limited) can be used to measure reflected power on an in-service link at the amplifier site. This method however, can take in the order of a few seconds to provide accurate results following a change in conditions at an input port, leaving enough time for the second input port to be disconnected following the first, resulting in above mentioned undesired mode of operation.

There is a need to provide a fast means for detecting LOS in a transmission system equipped with bidirectional optical amplifiers, irrespective if a data signal is present or absent.

SUMMARY OF THE INVENTION

It is an object of this invention to provide a fast means for detecting a LOS at the input of a bidirectional optical amplifier, which alleviates totally or in part of the drawbacks of the prior art.

It is another object of the invention to detect when one connector of a bidirectional optical amplifier has been disconnected and to shut-off quickly the pump laser in the corresponding direction for preventing Q-switching and self oscillation, should the other connector be disconnected.

Accordingly there is provided a detector fast signalling a loss of signal (LOS) condition at a forward input port of a bidirectional optical amplifier of a bidirectional optical transmission system with optical fiber amplifiers, comprising means for monitoring the forward input port, corresponding to a forward transmission channel, to obtain a first alarm signal, means for monitoring a forward output port of the amplifier, corresponding to the forward transmission channel, to obtain a second alarm signal, means for monitoring a reverse output port of the amplifier, corresponding to a reverse transmission channel, to obtain a third alarm signal, and means for processing the first, second and third alarm signals for generating the LOS signal.

The invention further comprises a fast loss of signal (LOS) detector for a bidirectional optical transmission system with an optical amplifier, an add/drop bidirectional optical service channel, and an optical band-pass filter connected at a reverse service output port of the amplifier, comprising means for monitoring the reverse service output port, to produce a service channel alarm whenever a forward service signal is detected at the reverse service output port, and means for processing the service channel alarm for generating a LOS signal.

The invention also comprises a fast loss of signal (LOS) detector for a bidirectional optical transmission system with an optical amplifier connected to a forward and a reverse transmission channels, comprising an optical tap arranged at an input port of the amplifier corresponding to the forward channel, for diverting a fraction of a forward optical signal traveling over the forward channel, an optical band-pass filter connected to the optical tap for retaining a reflection component present in the fraction based on the frequency of the reverse channel, means for converting the reflected component into a reflected voltage, and means for producing a LOS signal whenever the reflected voltage is higher than a threshold.

Further there is provided a method for detecting a loss of signal in an optically amplified transmission system, comprising, at an optical amplifier site, the steps of monitoring an input forward optical signal on a forward channel to produce a first alarm signal whenever the input forward optical signal increases over a first threshold, monitoring an output forward optical signal on the forward channel to produce a second alarm signal whenever the output forward optical signal drops under a second threshold, monitoring an output reverse optical signal on a reverse channel to produce a third alarm signal whenever the output reverse optical signal drops under a third threshold, and processing the first, second and third alarm signals and accordingly declaring a loss of signal (LOS) condition.

Advantageously, the present invention provides a method and apparatus which is an inexpensive addition to an optical amplifier module and gives a good accuracy in identifying the LOS. Being built into the equipment, it does not significantly disturb the traffic, and can be continuous or remotely monitored.

In addition, some of the components necessary for detecting LOS may be already present at the amplifier site, so that minimal HW may be needed.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1:
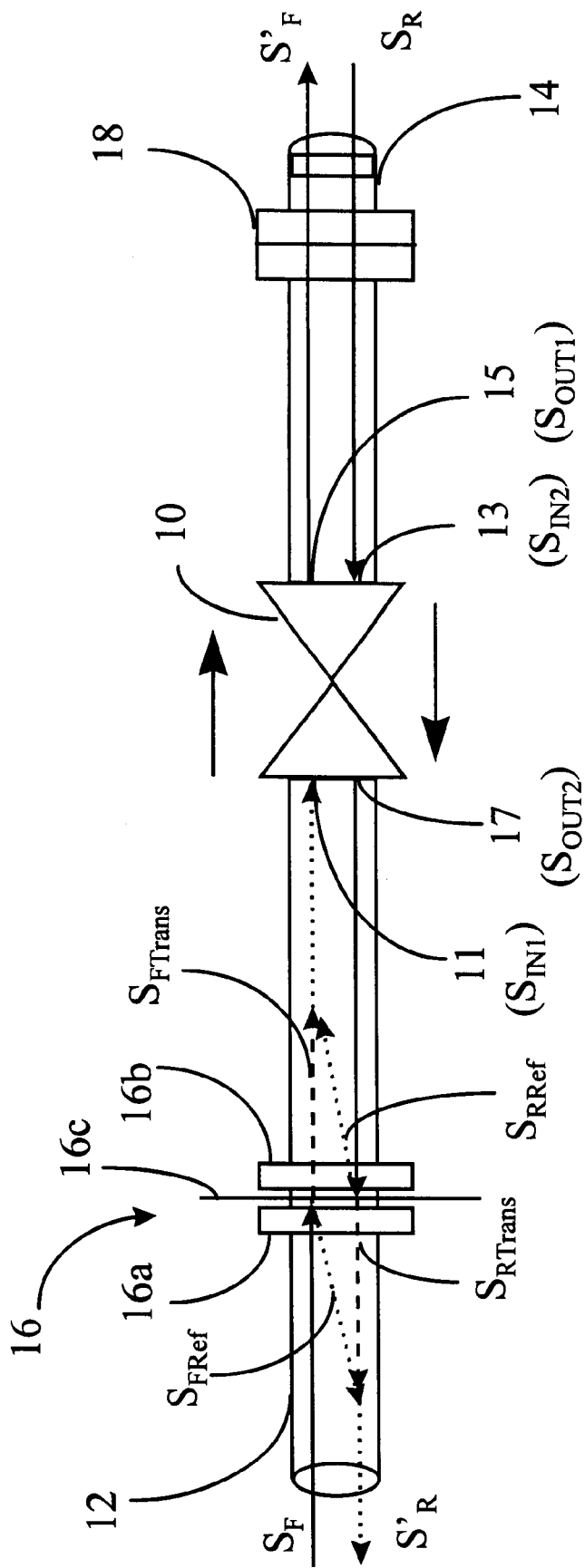
FIG. 1 shows how reflections occur when one of the connectors is disconnected, while the amplifier is operational.

FIG. 1 shows a bidirectional amplifier 10 connected to a fiber span 12 by a first connector 16 and connected to a fiber span 14 by a second connector 18. Connector 16 is shown in an open state, with halves 16a and 16b spaced apart and line 16c illustrating the reflection plane. Fibers 12 and 14 are shown intuitively with an oversized cross-section, for better illustrating the optical signals travelling over them.

Bidirectional amplifier 10 amplifies a forward optical signal $S_F$ to an amplified forward signal $S'_F$ and a reverse optical signal $S_R$ to an amplified reverse optical signal $S'_R$. In this disclosure, the term "forward" is used to indicate the direction from West to East, and the term "reverse" indicates the direction from East to West. It is to be understood that these are relative terms and they are interchangeable, without impacting on the mode of operation of the invention.

For the forward direction, the signal at the input port 11 of amplifier 10 is denoted with $S_{IN1}$ and the amplified forward signal at the corresponding output port 15 is denoted with $S_{OUT1}$. For the reverse direction, the signal at input port 13 is denoted with $S_{IN2}$ and the amplified reverse signal at the corresponding output port 17 is denoted with $S_{OUT2}$. It is to be noted that, under normal conditions of operation, $S_{IN1}$ is less than $S_F$ by the attenuation introduced by connector 16, and $S_{OUT1}$ is higher than $S'_F$ by the attenuation introduced by connector 18. Similar considerations apply for the reverse direction. Port 11 is also defined as "forward input port", port 15 is the "forward output port", port 13 is the "reverse input port", and port 17 is the "reverse output port".

FIG. 1 also shows the reflections at plane 16c, when connector 16 is disconnected while the amplifier 10 is operational, i.e. while the laser pumps for both directions are operational. The reflected signals are shown in fine dotted lines and the transmitted signals are shown in course dotted lines. The angle of incidence and reflection are not shown equal on FIG. 1, this drawings is intended to show the reflected and transmitted components in general.

When connector 16 is disconnected, forward signal $S_F$ is reflected at 16 as signal $S_{FRef}$ into reverse direction, and only a small part of $S_F$, namely $S_{FTrans}$, arrives at input port 11. Therefore, the power level of signal $S_F$ arriving at the input port 11 drops to essentially 0 mWatts.

On the other hand, in the event that the input signal power level $P_{Trans}$ is small enough in comparison to the output power $P_{OUT2}$ of the reverse direction, and the change in return loss $P_{RRef}$ is large enough, a net increase in total input power $S_{IN1}$ is observed at input port 11.

This is because the amplified output signal $S_{OUT2}$ is also reflected at 16c as $S_{RRef}$, which travels in the forward direction towards input port 11. In other words, the input power level $P_{IN1}$ at input port 11 will not drop and may in fact rise due to the reflected power $P_{RRef}$ from the reverse direction. The forward signal $S_{IN1}$ now comprises component $S_{RRef}$ is $S_{FTrans}$, and amplified forward signal $S'_F$ is not in fact the amplified version of forward signal $S_F$. The power level $P_{IN1}$ of the input signal $S_{IN1}$ in this case could be generally higher than the power level of the input signal under normal conditions of operation. We will note this power level is denoted herein with $P_{Break1}$.

As a result, monitoring for drops in total input power is not suitable LOS detection scheme for a bidirectional amplifier. Monitoring for reflected power increases at amplifier inputs provides more appropriate means of LOS detection.

The amount of the reflected power may be determined knowing the reflection coefficient of the faulty element at the reflection site. Reflection coefficient 'r' is defined as the ratio of reflected power over the incident power, which is for connector $16 r_{Con} = S_{RRef}/S_{OUT2}$ and is known to be −14 dB or 0.04 in linear terms.

Knowing the reflection coefficient $r_{con}$, the total input power after fiber 12 is disconnected $P_{Break1}$ can be predetermined from the knowledge of the output power level in the opposite direction $P_{OUT2}$. For given operating conditions, a threshold $TH_1$ can be defined between the measured input power $P_{IN1}$ and the total input power $P_{Break1}$, calculated for the case when connector 16 is disconnected.

The present invention provides means for monitoring the total power levers at the input and output of the amplifier in order to detect a LOS in bidirectional optical amplifier. For the input port in a particular direction, three of the four ports are monitored for obtaining an indication pertinent so that port and the information so gathered is processed for generating the LOS signal.

For example, for detecting a reflection at port 11, the power at each of input port 11, output port 15, and output port 17 is monitored to generate three alarm signals, as shown in FIGS. 2–5. The LOS is then determined by adequately processing these alarm signals.

Figure 2:
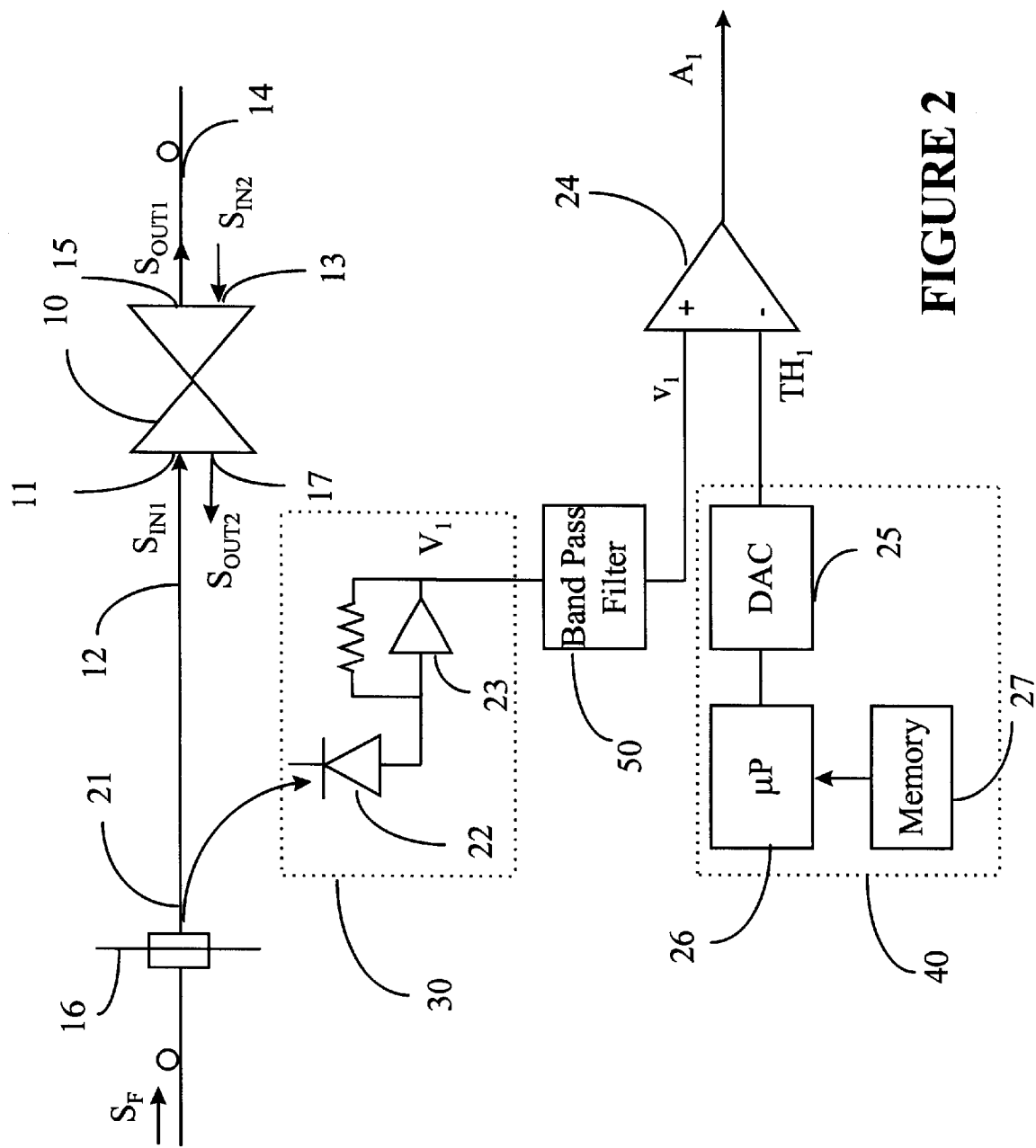
FIG. 2 shows a block diagram used for monitoring the input port of a bidirectional optical amplifier in the forward direction of transmission.

FIG. 2 shows how the forward input signal $S_{IN1}$ of bidirectional optical amplifier 10 is monitored in the forward direction of transmission for generating a first alarm signal $A_1$.

The forward signal $S_{IN1}$ is measured using an optical tap 21 using an optical-to-electrical (O/E) converter 30 comprising PIN diode 22 and transimpedance amplifier 23, in the known matter. A first voltage $V_1$ at the output of O/E converter 30 is proportional to the power level at the input port 11.

First voltage $V_1$ is then filtered in band-pass filter 50 to remove the DC component and provide deglitching. The first band-pass filtered voltage $v_1$ comprising information on any input power change, is then compared in comparator 24 to a first threshold $v_1$ comprising by a threshold generator 40.

In this measurement, signal $v_1$ is applied to the non-inverting input of comparator 24, while $TH_1$ is applied to the inverting input. Comparator 24 issues the first alarm signal $A_1$ whenever $v_1$ is greater than $TH_1$, i.e. $v_1$ crosses the threshold. The first alarm signal $A_1$ is then used in the LOS generation circuit of FIG. 5.

The threshold $TH_1$ is determined by a microprocessor 26 to be approximately half the voltage peak that will be at the non inverting input of the comparator, with connector 16 disconnected, namely $\frac{1}{2}v_{1Break}$. The output of microprocessor 26 is converted to $TH_1$ using a digital-to-analog converter (DAC) 25. First threshold $TH_1$ can be determined experimentally, or from a knowledge of the output power level in the reverse direction, the responsivity of PIN 22, and the gain of transimpedance amplifier 23. This information can be pre-stored in a memory 27. Alternatively, the value of this threshold can be adjusted closer to the voltage break $v_{1Break}$ for better false detection prevention, or closer to zero, for improved detection probability. Selection of the threshold is a compromise between these two requirements.

The high pass cutoff frequency of filter 50 is chosen such that if the threshold $TH_1$ is crossed, $v_1$ remains above threshold long enough to allow the LOS detection logic (to be described shortly in connection with FIG. 5) to capture the event. It should also be low enough such that the finite rise time of the total input power level can be detected accurately. The low pass cutoff frequency is chosen as a trade-off between activation speed and noise reduction. A nominal value would be of the order of 160 kHz.

Figure 3:
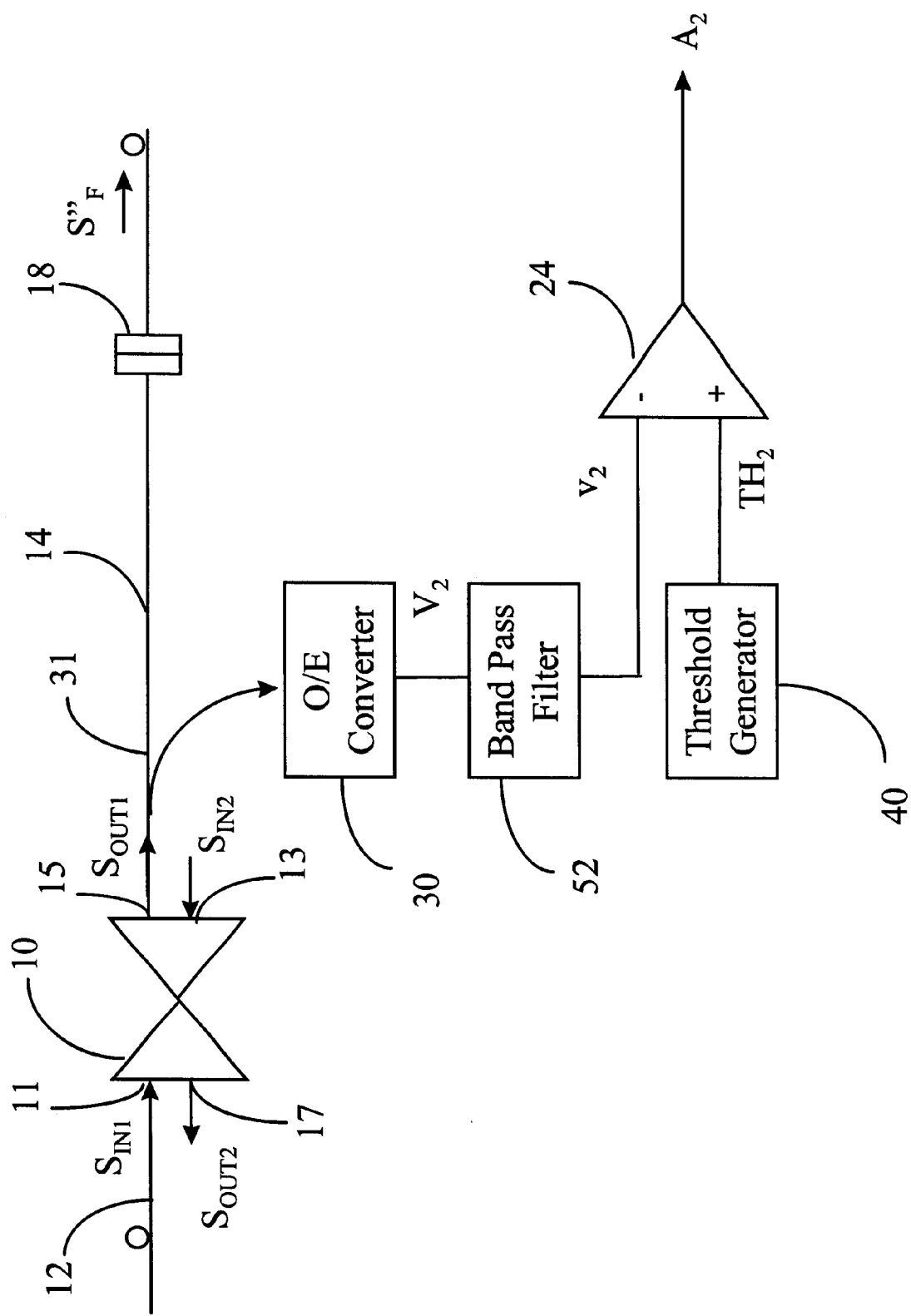
FIG. 3 illustrates means for monitoring the output port of a bidirectional optical amplifier in the forward direction of transmission.

FIG. 3 illustrates how the forward output signal $S_{OUT1}$ of bidirectional optical amplifier 10 is measured at output port 15. When fiber 12 is suddenly disconnected at connector 16, a temporary drop in output power $P_{OUT1}$ is observed. This is due to the fact that the amplifier gain cannot change instantaneously. The drop in output power $P_{OUT1}$ is captured by the circuit shown in FIG. 3.

An output tap 31 is connected at output port 15 for diverting a fraction of $S_{OUT1}$ to a second O/E converter 30'. O/E converter provides a second voltage $V_2$, corresponding to the output power $P_{OUT2}$ using a PIN diode 22', and a transimpedance amplifier 23'. While components 22' and 23' are nor shown for simplifying the drawing, they are connected as in the case of O/E converter 30 shown in FIG. 2.

A band-pass filter 52 filters $V_2$ to remove the DC component and for deglitching and provides a second band-pass filtered voltage $v_2$, comprising information on any change in output power $P_{OUT2}$ This filter preferably has a low pass cutoff frequency of 300 kHz and a high pass cutoff frequency of 16 Hz.

Threshold generator 40 is used to generate a second threshold $TH_2$. This generator is similar in structure to the generator 40, in fact it may use the same components. As the event to be detected represents a drop in power, voltage $v_2$ will have a negative peak value when fiber 12 is disconnected. Therefore, threshold $TH_2$ has a negative value and is applied to the non inverting input of a comparator 24', while the second band-pass filtered voltage $v_2$ is applied on the inverting input. The resulting alarm is denoted with $A_2$.

As the temporary drop in output power varies with amplifier output power, the threshold value $TH_2$ should ideally be set from a look up table in memory 27, with a knowledge of the output power, PIN 22' responsivity, and the gain of transimpedance amplifier 23'. This threshold should be set at approximately half the voltage of the peak that would be observed at the bandpass filter output when the fiber is disconnected, which we note with $\frac{1}{2}v_{2Break}$. Alternatively, $TH_2$ could again be biased for better false detection prevention or improved detection probability.

Figure 4:
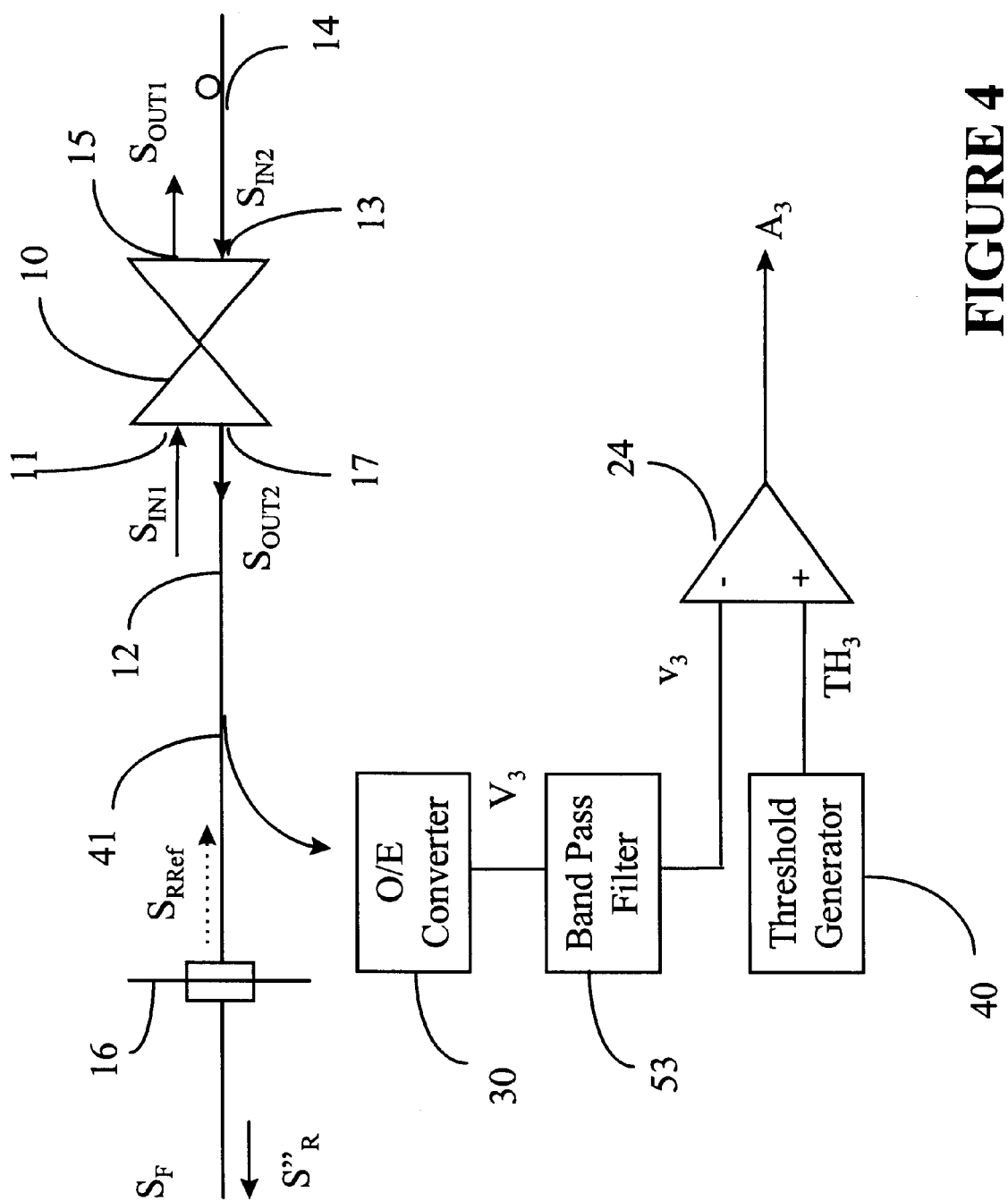
FIG. 4 shows means for monitoring the input port of a bidirectional optical amplifier in the reverse direction of transmission.

FIG. 4 shows how the reverse output signal $S_{OUT2}$ is measured, the circuit being similar to that of FIG. 3, with the difference that a tap 41 is connected at output port 17. When connector 16 is disconnected, a drop in power of signal $S_{OUT2}$ is observed at the output 17. This is because the signal reflected in the reverse direction ($S_{RRef}$ in FIG. 1) takes away some of the amplifier gain from signal $S_{OUT2}$.

This effect can be captured by the same type of circuit used to detect the power drop at the other output port. The alarm $A_3$ at the output of comparator 24" is generated whenever the negative peak of the third band-pass filtered voltage $v_3$ goes under a third threshold $TH_3$.

In this case, the drop in output power level is in general dependent on the change in reflection coefficient that is observed when the fiber is disconnected and the threshold $TH_3$ should be set by the microprocessor from a look up table indexed by output power level $P_{OUT2}$, PIN responsivity and gain of the transimpedance amplifier. This threshold should be set at approximately half the peak that would be observed at the bandpass filter output when the fiber is disconnected, namely $\frac{1}{2}v_{3Break}$. Alternatively, it cold be biased for better false detection prevention or improved detection probability.

The initial reflection coefficient can be determined by any known methods (e.g. that disclosed in the above identified U.S. patent application Ser. No. 08/588,776 (O'Sullivan et al.).

Figure 5:
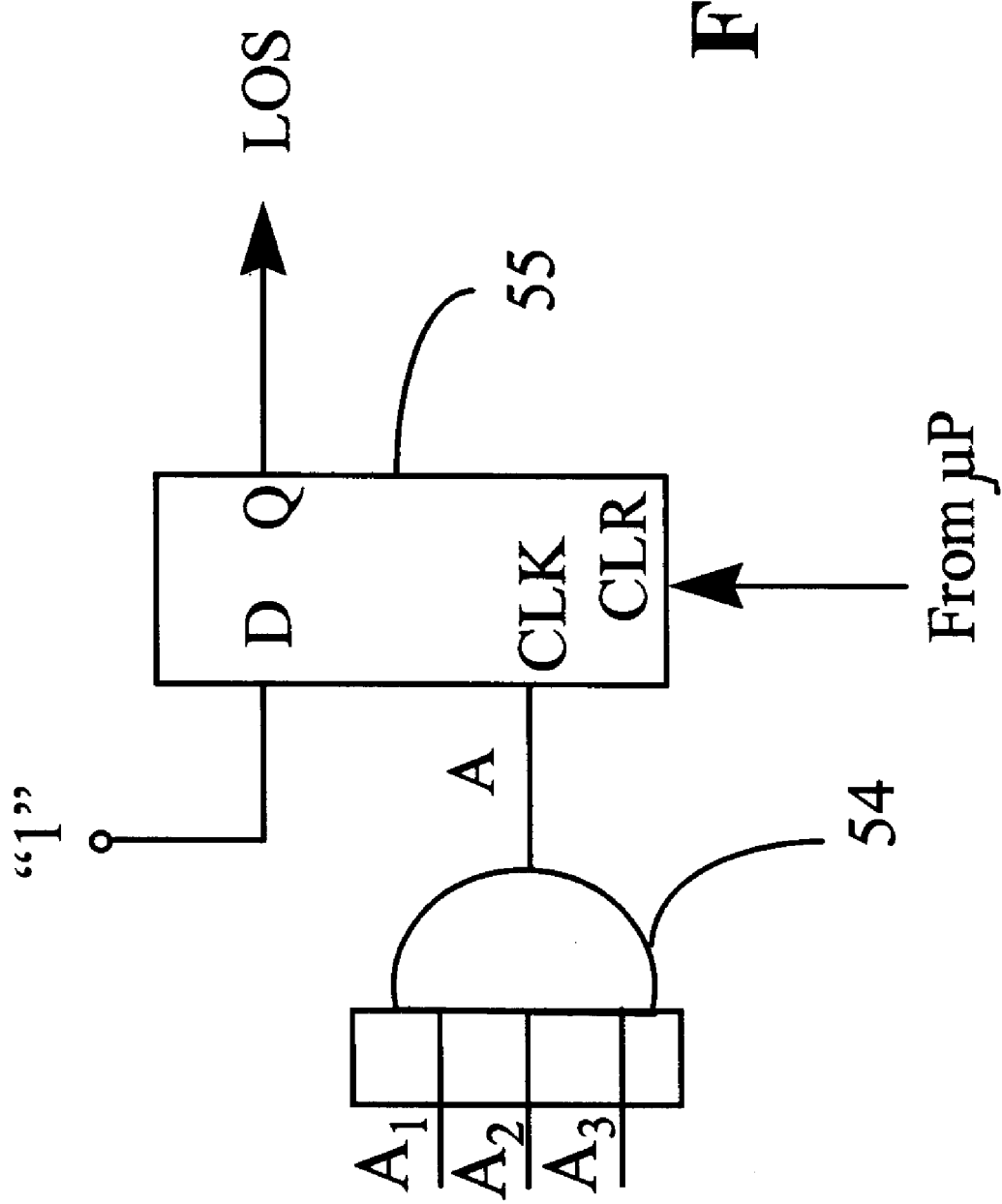
FIG. 5 is a LOS generation circuit.

When each characteristic power change alarm $A_1$ to $A_3$ is observed on the three ports simultaneously, the LOS condition is asserted as illustrated in FIG. 5, showing a LOS generating circuit. The three alarms $A_1$, $A_3$ and $A_3$ are added in AND circuit 54, and the resulting alarm signal A is used to clock a logic 1 to the output of a pre-cleared D flip-flop 55. LOS is then used to shut-down the laser pump of amplifier 10 for the forward direction.

Another method of fast LOS detecting is to use the optical service channel OSC or the bidirectional OSC (Bi-OSC) that is provided in many SONET transmission systems.

Bi-OSC is a service channel that is transmitted and terminated at each optical amplifier site and is provided with a transmitter/receiver pair, to give the user access to the service information. The average optical power of the Bi-OSC is accounted for in the link budget, in order to make the average output control in the forward direction of transmission and in the reverse direction of transmission more accurate by subtracting the power contribution from the respective OSC channels. As Bi-OSC is transmitted on the same fiber with the information channels, a break in the transmission link can be determined on this channel.

For an amplified link provided with a Bi-OSC channel, LOS detection according to this invention provides for monitoring the reflected power level at the optical service channel wavelength, and AND-ing the event of a reflected power increase with the loss of frame (LOF) condition for the add/drop channel.

Figure 6:
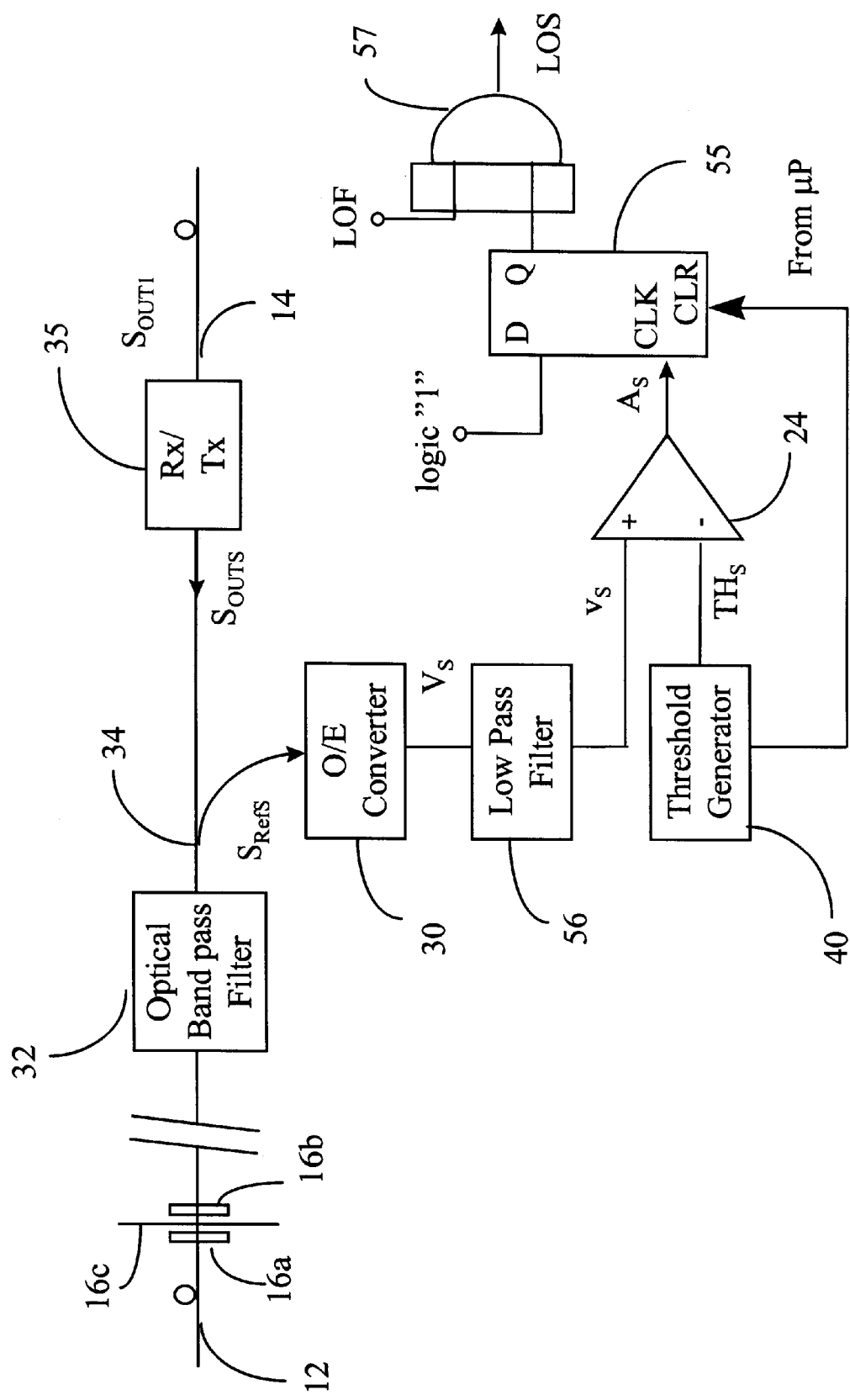
FIG. 6 illustrates means for monitoring the service channel for detecting LOS.
Figure 7:
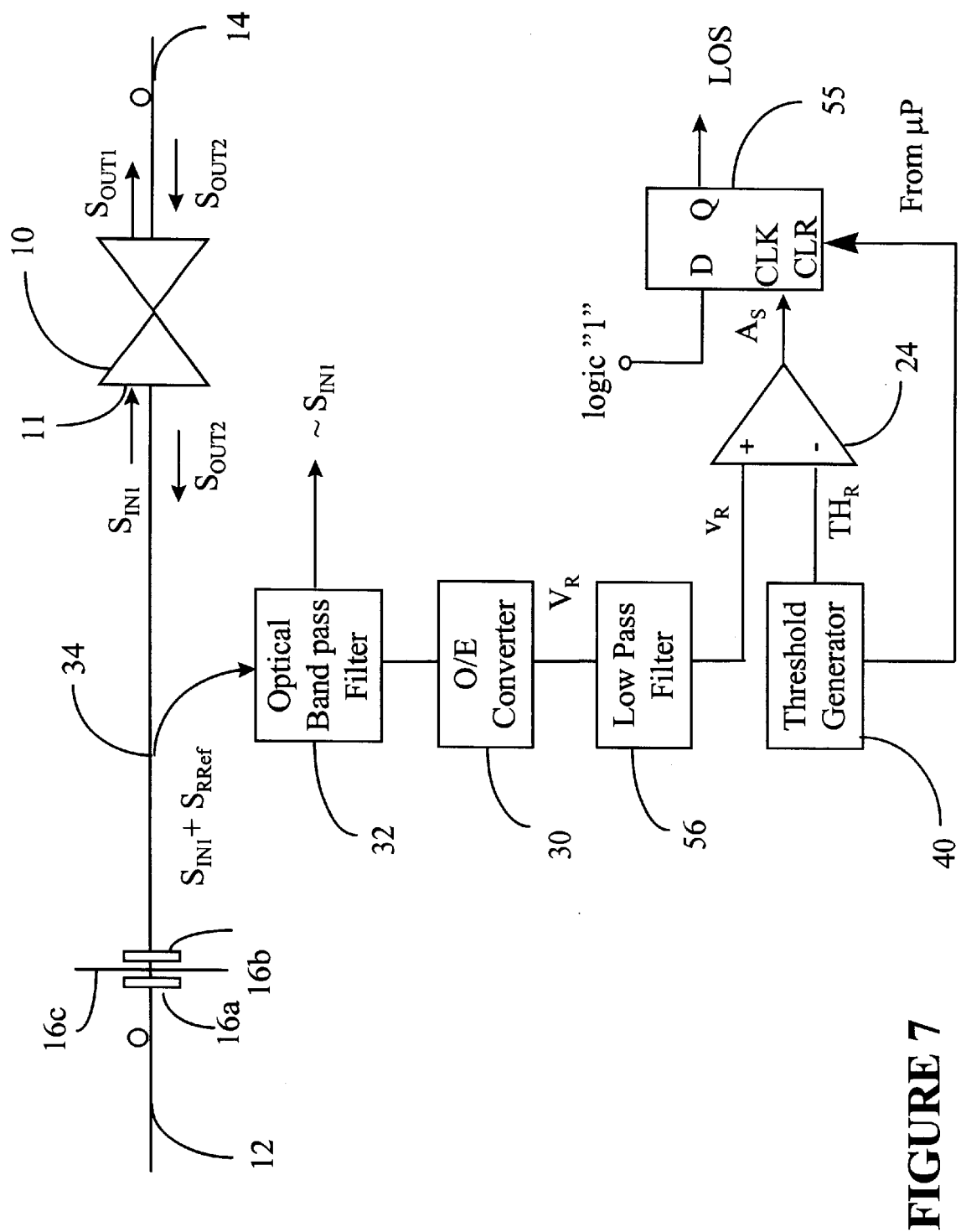
FIG. 7 shows a further block diagram used for monitoring the input port of a bidirectional optical amplifier in the forward direction for detecting LOS.

A circuit to implement this method is shown in FIG. 6. An optical band-pass filter 32 is provided between connector 16 and Rx/Tx terminal 35 to prevent any other signal from being present at the input of receiver Rx.

If connector 16 is disconnected, the optical output $S_{OUTS}$ of the respective optical transmitter 35 for the service channel is reflected at 16c and the reflected optical signal $S_{Refs}$ travels on the fiber in the forward direction towards the input of receiver 35.

Between Rx/Tx 35 and filter 32, the optical reflected signal $S_{Refs}$ is tapped at 34, in the same manner as indicated above, and converted to a service voltage $V_S$ in O/E converter 30. Voltage $V_S$, corresponding to the reflected power at the transmitted wavelength, is then low-pass filtered in filter 56 to provide deglitching.

The low-pass filtered voltage $v_s$ proportional to the reflected power change is then compared in comparator 24 to a threshold $TH_S$, produced by threshold generator 40, $v_S$ being applied on the non-inverting input and $TH_S$, on the inverting input. The service channel alarm signal output by comparator 24 is noted herein with $A_S$.

Threshold $TH_s$ is set as in the previous cases using the microprocessor 26, and is chosen at approximately half the voltage that will be at the non inverting input of the comparator 24, should the fiber be disconnected, namely $\frac{1}{2}v_{SBreak}$. This voltage can be determined from a knowledge of the add/drop optical service channel transmitted power $P_{OUTS}$, the PIN responsivity, and the transimpedance gain. Alternatively, threshold $TH_S$, can be biased closer to the voltage after the fiber is disconnected for better false detection prevention, or closer to zero for improved detection probability.

The low-pass cutoff frequency is chosen as a trade-off between activation speed and noise reduction. For example, this frequency could be 160 kHz for Nortel's Bi-OSC.

When the fiber is disconnected, the rise in reflected power creates a positive edge $A_s$ to clock input of the previously cleared D flip-flop 55, which subsequently clocks a "logic 1" to the output. This thereby latches in the event at the output "Q" of latch 55.

Output "Q" is then AND-ed with the LOF condition detected over the optical service channel in the corresponding direction, to provide the LOS at the output of AND gate 57.

Another technique that may be used for fast detection of LOS is illustrated in FIG. 6 and described next. This technique may be used for both systems with and without an optical service channel or other additional wavelength.

At the input port to the amplifier 10, a power monitor tap 34 is typically used for input power monitoring purposes. If connector 16 is open or the fiber is disconnected in any way at input port 11, the light which has been tapped off of the main path consists of the incoming signal $S_{IN1}$ and reflected output light $S_{RRef}$. A WDM filter 32 is used to separate the reflected light from the other input light. The WDM filter acts as a band pass filter in the output wavelength band, hence allowing only reflected light to pass. The WDM filter 32 also directs the light which is not in the output band to another port which can be used to measuring the input power.

The reflected light is directed to a O/E converter 30 including a PIN detector 22 and transimpedance amplifier 23, (shown on FIG. 2) which, as in the previous examples, converts the reflected light to a proportional voltage $V_R$. The voltage corresponding to the reflected power at the transmitted wavelength is then filtered in a low-pass filter 56 to remove glitches and high frequency noise. The low pass cutoff frequency is chosen according to the desired response time. The greater the cutoff frequency, the faster the response time. Preferably, this value is 160 kHz.

The filtered voltage $v_R$ corresponding to the reflected power change is then compared to a threshold $TH_R$ set by a threshold generator 40 in a comparator 24. The filtered voltage $v_R$ is applied on the non-inverting input of the comparator 24, while the threshold $TH_R$ is applied on the inverting input.

The threshold $TH_R$ is chosen at approximately half the voltage level that will be at the non inverting input of the comparator should the filter be disconnected. This voltage can be determined from a knowledge of the output power, the PIN responsivity, and the transimpedance gain. Alternatively, this threshold can be biased closer to the voltage peak for better false detection prevention, or closer to zero for improved detection probability.

When the fiber is disconnected, the rise in reflected power creates a positive edge to the clock input of a previously cleared D flip-flop 55, which subsequently clocks a logic "1" to the output. This thereby latches in the event as the LOS signal at the output Q of the flip-flop.

To clear the LOS condition in each of the fast LOS detection methods described above, the CLEAR line on the D flip-flop 55 is asserted by the microprocessor 26. The condition to clear the LOS can be determined on the microprocessor by detecting the amount of reflection present at the input port where the LOS was declared. The amount of reflection can be determined by any prior art method, such as that of above U.S. patent application Ser. No. 08/588,776 (O'Sullivan et al.) as clearing the LOS condition does not require the same fast response speed as asserting it does.

What is claimed is:

1. A detector fast signalling a loss of signal (LOS) condition at a forward input port of a bidirectional optical amplifier of a bidirectional optical transmission system with optical fiber amplifiers, comprising:

means for monitoring said forward input port, corresponding to a forward transmission channel, to obtain a first alarm signal;

means for monitoring a forward output port of said amplifier, corresponding to said forward transmission channel, to obtain a second alarm signal;

means for monitoring a reverse output port of said amplifier, corresponding to a reverse transmission channel, to obtain a third alarm signal; and means for processing said first, second and third alarm signals for generating said LOS signal.

2. A LOS detector as claimed in claim 1, further comprising a threshold generator for providing a plurality of thresholds.

3. A LOS detector as claimed in claim 2, wherein said means for monitoring said forward input port comprises:

a first optical tap for diverting a fraction of a forward input signal at said forward input port;

a first optical-to-electrical (O/E) converter for converting said fraction into a first voltage;

a first band-pass filter for removing the DC component and deglitching said first voltage to provide a first filtered voltage; and a first comparator for comparing said first filtered voltage with a first threshold generated with said threshold generator.

4. A LOS detector as claimed in claim 2, wherein said means for monitoring said forward output port comprises:

a second optical tap for diverting a fraction of a forward output signal provided at said forward output port;

an O/E converter for converting said fraction into a second voltage;

a band-pass filter for removing the DC component and deglitching said second voltage to provide a second filtered voltage; and a comparator for comparing said second filtered voltage with a second threshold generated with said threshold generator.

5. A LOS detector as claimed in claim 2, wherein said means for monitoring said reverse output port comprises:
a third optical tap for diverting a fraction of a reverse output signal provided at said reverse output port;
an O/E converter for converting said fraction into a third voltage;
a band-pass filter for removing the DC component and deglitching said third voltage to provide a third filtered voltage; and
a comparator for comparing said second filtered voltage with a second threshold generated with said threshold generator.

6. A LOS detector as claimed in claim 2, wherein said threshold generator comprises:
a memory for storing tables with the operating parameters of said amplifier;
a microprocessor for accessing said operating parameters and generating a digital threshold associated with each of said forward input port, forward output port and reverse input port;
a digital-to-analog converter for converting each of said digital thresholds to a respective analog threshold.

7. A LOS detector as claimed in claim 1, wherein said means for processing comprises:
means for logically adding said first, second and third alarm signals to obtain an alarm signal:
means for locking said alarm signal and generating said LOS signal.

8. A LOS detector as claimed in claim 7, wherein said means for locking comprises a latch for receiving said alarm signal on the clock input, a logic "1" on the D input and providing said LOS signal on the Q output.

9. A LOS detector as claimed in claim 8, wherein said latch is reset by said threshold generator.

10. A LOS detector according to claim 3, wherein the high-cutoff frequency of said first band-pass filter allows said first alarm to be captured by said means for locking and has a finite rise time for accurate detection by said first comparator.

11. A method according to claim 3, wherein the low-cutoff frequency of said first band-pass filter allows noise reduction and high activation speed.

12. A fast loss of signal (LOS) detector for a bidirectional optical transmission system with an optical amplifier, an add/drop bidirectional optical service channel, and an optical band-pass filter connected at a reverse service output port of said amplifier, comprising:
means for monitoring said reverse service output port, to produce a service channel alarm whenever a forward service signal is detected at said reverse service output port; and
means for processing said service channel alarm for generating a LOS signal.

13. A LOS detector as claimed in claim 12, wherein said means for monitoring comprises:
an optical tap arranged between said band-pass filter and said reverse output service port for diverting a fraction of said forward service signal;
a service optical-to-electrical (O/E) converter for converting said fraction into a service voltage;
a low-pass filter for deglitching said service voltage to provide a service filtered voltage; and
a service comparator for comparing said service filtered voltage with a service threshold generated with said threshold genrator.

14. A LOS detector as claimed in claim 12, wherein said means for processing comprises:
a latch for receiving said service channel alarm on the clock input, a logic "1" on the D input and providing a locked alarm signal on the Q output; and
an AND gate for adding said locked alarm signal to a "loss of frame" signal available at said amplifier, to provide said LOS signal.

15. A fast loss of signal (LOS) detector for a bidirectional optical transmission system with an optical amplifier connected to a forward and a reverse transmission channels, comprising:
an optical tap arranged at an input port of said amplifier corresponding to said forward channel, for diverting a fraction of a forward optical signal traveling over said forward channel;
an optical band-pass filter connected to said optical tap for retaining a reflection component present in said fraction based on the frequency of said reverse channel;
means for converting said reflected component into a reflected voltage; and
means for producing a LOS signal whenever said reflected voltage is higher than a threshold.

16. A LOS detector as claimed in claim 15, wherein said means for producing comprises:
a low-pass filter for filtering said reflected voltage to obtain a filtered reflected voltage;
a comparator for comparing said filtered reflected voltage with said threshold and providing an alarm signal; and
a latch for capturing the increase of said filtered reflected voltage over said threshold.

17. A method for detecting a loss of signal in an optically amplified transmission system, comprising, at an optical amplifier site, the steps of:
monitoring an input forward optical signal on a forward channel to produce a first alarm signal whenever said input forward optical signal increases over a first threshold;
monitoring an output forward optical signal on said forward channel to produce a second alarm signal whenever said output forward optical signal drops under a second threshold;
monitoring an output reverse optical signal on a reverse channel to produce a third alarm signal whenever said output reverse optical signal drops under a third threshold; and
processing said first, second and third alarm signals and accordingly declaring a loss of signal (LOS) condition.

18. A method as claimed in claim 17, further comprising defining each of said first, second and third threshold during normal conditions of operation of the transmission system, by measuring the respective steady state reflection levels in said input and output forward optical signals and in said output reverse optical signal.

19. A method as claimed in claim 18, further comprising the steps of:
detecting the amount of reflection in said input forward optical signal during said LOS condition; and
clearing the LOS indication when the amount of reflection in said input forward optical signal falls under said first threshold.

20. A method according to claim 18, further comprising turning off the laser pump of said optical amplifier for said forward channel with said LOS signal.

* * * * *